US006115746A

United States Patent [19]
Waters et al.

[11] Patent Number: 6,115,746
[45] Date of Patent: Sep. 5, 2000

[54] DISTRIBUTED CONTROL OF AIN AND NON-AIN SWITCHES AND RESOURCES IN AN ADVANCED INTELLIGENT NETWORK

[75] Inventors: Randal Eugene Waters, McKinney; Michael Keith Kielhofer, Carrollton, both of Tex.

[73] Assignee: IEX Corporation, Richardson, Tex.

[21] Appl. No.: 08/954,364

[22] Filed: Oct. 20, 1997

[51] Int. Cl.[7] .................................................. G06F 15/16
[52] U.S. Cl. .......................................... 709/229; 379/165
[58] Field of Search ...................................... 379/156–166, 379/219–226, 242–243; 709/229, 227

[56] References Cited

U.S. PATENT DOCUMENTS

| | | | |
|---|---|---|---|
| 5,553,119 | 9/1996 | McAllister et al. | 379/67 |
| 5,574,904 | 11/1996 | Yunoki et al. . | |
| 5,619,562 | 4/1997 | Maurer et al. | 379/201 |
| 5,664,102 | 9/1997 | Faynberg | 709/246 |
| 5,666,400 | 9/1997 | McAllister et al. | 379/67 |
| 5,790,634 | 8/1998 | Kinser, Jr. et al. | 379/29 |
| 5,812,640 | 9/1998 | Chawla et al. | 379/88.19 |
| 5,915,008 | 6/1999 | Dulman | 379/201 |

OTHER PUBLICATIONS

Dr. Bernard S. Ku; "A Reuse–Driven Approach for Rapid Telephone Service Creation"; IEEE; pp. 64–72, Mar. 1994.

Primary Examiner—Zarni Maung
Attorney, Agent, or Firm—David H. Judson

[57] ABSTRACT

An apparatus for use in an advanced intelligent network (AIN) having a service control point (SCP). The apparatus includes a number of functional components "abstracted" into a control hierarchy including a rules engine, one or more enhanced service applications, one or more intelligent peripheral controllers, and a set of intelligent peripheral adapters. The rules engine supports one or more rules for use in provisioning an enhanced service according to the enhanced service application. Each enhanced service (ES) application translates each rule required by the application into a set of one or more application level service primitives for its associated IPC. The IPC, in turn, translates each application level service primitive into a set of directives to control each intelligent peripheral adapter (IPA) connected to the IPC. At the lowest level of the hierarchy, an IPA translates each IPA directive into actual hardware instructions for controlling a particular switch or resource.

8 Claims, 2 Drawing Sheets

DISTRIBUTED CONTROL OF AIN AND NON-AIN SWITCHES AND RESOURCES IN AN ADVANCED INTELLIGENT NETWORK

BACKGROUND OF THE INVENTION

1. Technical Field

The present invention relates to an advanced intelligent network (AIN) and, in particular, to methods and apparatus for abstracting network functions and distributing network control associated with an AIN service across multiple AIN-based and non-AIN-based resources in the network.

2. Description of the Related Art

The advanced intelligent network (AIN) is an evolving service-independent network architecture that enables control functions to be implemented in software and located in distributed computer nodes throughout a network. The architecture theoretically allows for rapid service creation and deployment (provided all network elements comply with the existing AIN standard).

The AIN architecture comprises a number of functional components. A service switching point (SSP) is a switching system with appropriate software for recognizing a call that requires AIN processing by an associated network system known as a service control point (SCP). Using a well-defined call model, the SSP recognizes a variety of so-called "triggers" associated with a call and, in response, generates queries to the SCP. Information received from the SCP is then used to further process the call. An SCP is typically connected to an SSP through a signal transfer point (STP), which is a packet switch that routes messages between the SSP and the SCP using common channel signaling (e.g., SS7). An AIN system may also include an intelligent peripheral (IP), which provides voice announcements and other similar services, and a service management system (SMS) that accommodates provisioning, maintenance, administration and service creation.

Although the call model intended to be implemented in a conventional AIN could provide rich functionality over a non-AIN based architecture, there are inherent limitations in the SSP that limit flexibility. In particular, the SSP is typically implemented using an existing network tandem (or Class 5) switching system. The AIN feature set supported by an existing switching system, while robust, is very limited. As a result, the type of enhanced services that may be implemented are often dependent on the capabilities (or lack thereof) of the existing switch. In addition, the SCP's role in the AIN is typically limited to supporting the data needed by the SSP.

Service providers and customers desire to provide a wide range of enhanced services. Such services, however, cannot be provisioned with the AIN feature set supported on existing switches and this limited SCP functionality. The present invention addresses this problem.

SUMMARY OF THE INVENTION

It is thus an object of this invention to provide advanced intelligent network enhancements that overcome the inherent limitations of the prior art.

It is a more specific object of this invention to eliminate the dependency of an advanced intelligent network on a conventional tandem switching system.

It is yet another specific object of the present invention to provide an advanced intelligent network implementation wherein control functions associated with an AIN service are "abstracted" across multiple AIN-based and non-AIN-based resources in the network.

Another important object of this invention is to enhance an AIN service control point to include an "abstract" hierarchy of control components that isolate control functionality from hardware dependencies.

Still another important object of this invention is to provide a method and system for enhanced network services that provides abstracted control over both AIN and non-AIN switches and resources.

In one embodiment, these and other objects of the invention are provided by an apparatus for use in an advanced intelligent network having a service control point. The apparatus is preferably implemented in software running on a computer and includes a number of functional components "abstracted" into a control hierarchy to facilitate call handling and to facilitate service creation. The control hierarchy comprises a rules engine, one or more enhanced service applications, one or more intelligent peripheral controllers, and a set of intelligent peripheral adapters. The rules engine supports one or more rules for use in provisioning an enhanced service according to the enhanced service application. Each enhanced service (ES) application preferably has an intelligent peripheral controller (IPC) associated therewith. The ES application translates each rule required by the application into a set of one or more application level service primitives for its associated IPC. The IPC, in turn, translates each application level service primitive into a set of directives to control one or more intelligent peripheral adapters (IPA) connected to the IPC. At the lowest level of the hierarchy, an IPA translates each IPA directive into actual hardware instructions for controlling a particular switch or resource.

A given IPA preferably conforms to one of three (3) different connection types: a network connection (Type I), a non-network connection (Type II) or a data connection (Type III). According to the invention, a given IPA may be supported on an AIN or non-AIN network connection (if Type I), on a non-AIN network resource (if Type II), or a data connection resource (if Type III). The IPA, at the lowest level of the control hierarchy, is thus resource- and hardware-dependent. The IPC, on the contrary, is resource-dependent (in the logical sense) and hardware-independent. The ES application is both resource- and hardware-independent. This abstracted control architecture provides significant flexibility for provisioning and managing AIN-based enhanced services.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE PREFERRED EMBODIMENT

Figure 1:
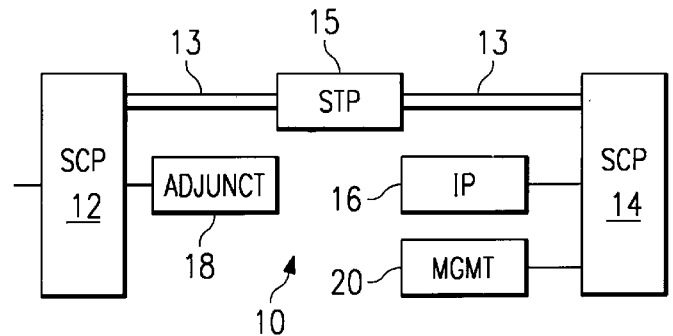
FIG. 1 is a representative advanced intelligent network (AIN) of the prior art.

Familiarity with the basic principles of an advanced intelligent network (AIN) architecture are presumed. This architecture is well-known in the literature, e.g., TR-NWT-001284, *Advanced Intelligent Network (AIN) 0.1 Switching Systems Generic Requirements,* Bellcore, Issue 1, August 1992, which is incorporated herein by reference. Referring now to FIG. 1, a block diagram of a conventional advanced intelligent network (AIN) 10 is shown. AIN includes a service switching point (SSP) 12, a service control point (SCP) 14, an intelligent peripheral (IP) 16, an (optional) adjunct 18 and a management system 20. The SSP 12 is a switching system with software that recognizes a call requiring AIN processing. SSP 12 thus detects requests for AIN-based services and establishes communications with AIN service logic located at the SCP 14. The SCP 14 typically comprises service logic programs and data that are used to provide AIN-based services. The SSP and SCP are normally interconnected by a common channel signaling network (CCSN) 13 or "SS7 network." As is well-known, an SS7 network 13 comprises packet data links and a packet data switching system called a signal transfer point (STP) 15. SS7 network 13 allows call setup information and control signaling between the SSP and the SCP to travel "out-of-band." The intelligent peripheral (IP) 16 provides various resources such as custom voice prompts and announcements, voice recognition and digit collection. The adjunct 18 (if implemented) is similar in function to the SCP, except that it is connected directly to the SSP, usually with a high speed Ethernet connection. Service management system 20 provides an interface for provisioning, maintenance, administration and service creation.

The basic "call model" for AIN is also documented in the literature. Thus, for example, in AIN Release 0.1, the call model defines the SSP call processing activities required to establish, maintain and clear a basic call. The call model comprises a number of points-in call (PICs) and one or more trigger detection points having associated triggers. A call proceeds through the defined PICs. When a trigger occurs at a trigger detection point, normal call processing is suspended by the SSP and a query message is sent to the SCP. In particular, and with reference back to FIG. 1, SSP formulates an AIN query, which is then delivered via the AIN protocol over the SS7 transport layer through the STP and then to the SCP. After the SCP service logic acts on the query, the SCP formulates a response, which is then sent back to the SSP via the same transport mechanism. Processing then continues at the original call suspension point.

Figure 2:
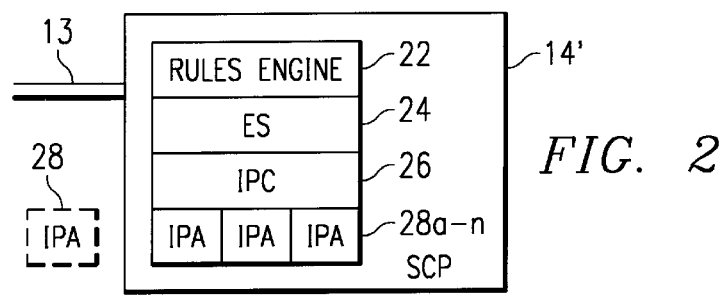
FIG. 2 is a block diagram of a service control point enhanced according to the teachings of the present invention.

The above-described mechanism is enhanced according to the principles of the present invention by abstracting AIN service control functions in a control hierarchy. In the inventive architecture, shown in FIG. 2, SCP 14' comprises a number of functional components that provide so-called "abstracted" control over AIN and non-AIN switches and resources. In particular, SCP 14' comprises a rules engine 22, one or more enhanced services applications 24, one or more intelligent peripheral controller(s) (IPCs) 26a–26n, and a set of intelligent peripheral adapters (IPAs) 28a–28n. An IPA may be supported on the SCP 12' or, as will be described (and as is illustrated in FIG. 2), the IPA (or a given IPA of a set) may reside on some other component or resource, which provides important advantages over the prior art. Each of these elements are preferably software running on a general purpose computer.

There is preferably one enhanced service application 24 for each IPC 26. This architecture promotes scalability. According to a feature of the present invention, each of the IPAs preferably conform to one of three (3) different connection "types":

(1) a network connection IPA (Type I);

(2) a non-network connection IPA (Type II); or (3) a data connection IPA (Type III).

A network connection IPA is an IPA associated with a AIN or non-AIN "network" connection (e.g., a switch or signal transfer point). A "non-network" connection IPA is an IPA associated with a device or resource that is not a network element (e.g., an intelligent voice response (IVR) unit, a modem, etc.). A data connection IPA is an IPA associated with a "data" connection to a non-AIN data service (e.g., a credit card validation subsystem, an operator services platform, an LIDB platform, an IS41C platform, etc.).

According to a feature of the present invention, a given intelligent peripheral adapter (IPA) may be supported on or associated with an AIN or non-AIN network connection (if Type 1), on or associated with a non-AIN resource (if Type II), or on or associated with a data service (if Type III).

The present invention implements so-called "abstracted" control over the AIN service functionality implemented in the rules describing the service. It also facilitates abstracted control over the service creation environment. The IPA is at the lowest level of this abstraction. A given IPA is resource-dependent and hardware-dependent. It is used to implement specific resource functionality and to provide local hardware resource management. The IPC is at the next lowest level of the control hierarchy. The IPC, as compared to an IPA, is resource-dependent but only in a logical sense, and the IPC is hardware-independent. It does not directly control the implementation of any specific hardware functionality (which is preferably handled by the IPA attached to the IPC). Rather, the IPC manages distributed resources (through its associated IPAs), keeps track of all such resources (logically) and, to some degree, manages call states.

Thus, the IPC manages a class of devices, and the IPA does device-specific work. In this way, the IPC's function is to make all such different devices look the same at its level of abstraction. This architecture masks differences that exist across multiple resource types.

The enhanced service (ES) application associated with an IPC is at the next highest level of abstraction, and thus is resource- and hardware-independent. The enhanced service application manages call states (but has no knowledge of the resources per se), and its main function is to abstract the rules (from the rules engine 22) to a set of application level service primitives for its associated IPC. Thus, for each rule in the rules engine 22, the enhanced service application generates one or more application level service primitives that an IPC uses to create one or more IPA directives for each of its associated IPAs. Each IPA directive is used by the IPA to create one or more hardware instructions for the specific hardware (be it Type I, Type II or Type III) that supports the IPA.

Representative application level service primitives may comprise a number of items, such as the following:

Attach—This message is sent to an IPC to instruct it to attach an automatic or reserved Resource to a Leg.

Background—This message is sent to an IPC to indicate that background tones like dial tone, busy signal, music, etc. should be applied to the specified Leg.

Bridge Call—This message is sent to an IPC to indicate that two network legs should be cross connected to one another.

Cancel—This message is sent to an IPC to request an AIN connection to continue routing.

Continue—This message is sent to an IPC to cancel all outstanding PlayAndConnect, PlayMessages, Record, and Voice Data IVR requests.

Card Transaction—this message is sent to an IPC to request a credit card transaction.

Conference Begin—This message is sent to an IPC to begin a conference.

Conference Bridge—This message is sent to an IPC to begin a conference.

Conference Dial—This message is sent to an IPC to instruct it to dial a telephone number on the specified Leg. The IPC will allocate an outgoing Line before dialing.

Conference End—This message is sent to inform the IPC that an existing conference is to be torn down. All legs, except Leg. 1, will be hung-up (which also releases them from the conference).

Dial Call—This message is sent to an IPC to instruct it to dial a telephone number on the specified Leg. The IPC may optionally allocate an outgoing Line (depending on the value of parameter SecondDial).

Dial Modem—This message is sent to an IPC to instruct it to dial a telephone number on the specified Leg and subsequently connect a modem. The IPC may optionally allocate an outgoing Line.

Drop Line—This message is sent to an IPC to instruct it to disconnect (HangUp) a Leg. If this was a non-conferenced Leg and the Leg was Bridged (connected to another Leg), the other Leg will be automatically connected to a background source as specified in the message below. If this was a conferenced Leg, the Network Line will also be released from the conference.

Drop Attach—This message is sent to an IPC to instruct it to disconnect (HangUp) the attachment side of a Leg. If the Leg was connected to the network, the network will be automatically connected to silence. This message requires no additional parameters.

Hangup—This message is sent to an IPC to instruct it to disconnect (HangUp) all Lines associated with a Session. The IPC will release all resources associated with the specified session and, subsequently, destroy the session itself.

Intercept—This message is sent to an IPC to instruct it to disconnect (HangUp) all Lines associated with a Session and route an incoming line to intercept. The IPC will release request the device controlling the incoming line to play an intercept message, release all resources associated with the specified session and, subsequently, destroy the session itself.

Monitor—This message is sent to an IPC to instruct it to start monitoring for digits, or flash.

Pass Through—This message is sent to an IPC to instruct it to send application supplied data directly to the equipment IPA. The IPA will interpret and use the data directly.

Play and Collect—This message is sent to an IPC to instruct it to play one or more prerecorded audio messages and collect DTMF digits from the specified Leg.

Play Messages—This message is sent to an IPC to instruct it to play one or more messages.

Record—This message is sent to an IPC to instruct it to record a voice message on the specified Leg. If messages are specified, they will be played first.

Release—This message is sent to an IPC to instruct it to release (mark unreserved) a non-network Resource. The specified Resource status will be changed to not-reserved.

Reserve—This message is sent to an IPC to instruct it to reserve a Resource for a Line. The reserved Resource will automatically be used when needed. This Resource will only be released when the Session is HungUp or when the application specifically requests a Release.

Route—This message is sent to an IPC to request an AIN interface to route a call.

Text-to-Speech—This message is sent to an IPC to instruct it to convert and say the specified text characters as speech. Voice messages and text will be said in the order the parameters are specified. Message will be converted to the proper language following each language specification in the order.

Text-to-Speech and Collect—This message is sent to an IPC to instruct it to convert and say the specified text characters as speech and collect DTMF digits from the specified Leg. Voice messages and text will be said in the order the parameters are specified. Message will be converted to the proper language following each language specification.

Voice Data—This message is sent to an IPC to instruct it to attach a voice recognizer Resource and collect caller spoken digits or requests.

Verify Session—This message is used by an application to request an IPC to verify session information. Typically this is done when a call session is suspected to be no longer valid.

According to the invention, the IPC preferably has no responsibility for knowing the specific details of the resource connected to the SCP. The IPAs abstract the various resource types from the IPC, and this enables the IPA to be supported on any type of resource. This provides powerful "abstracted" control over AIN and non-AIN resources in an advanced intelligent network implementation comprising the SCP 14'. This abstracted control allows management of AIN and non-AIN resources all at the same time.

Figure 3:
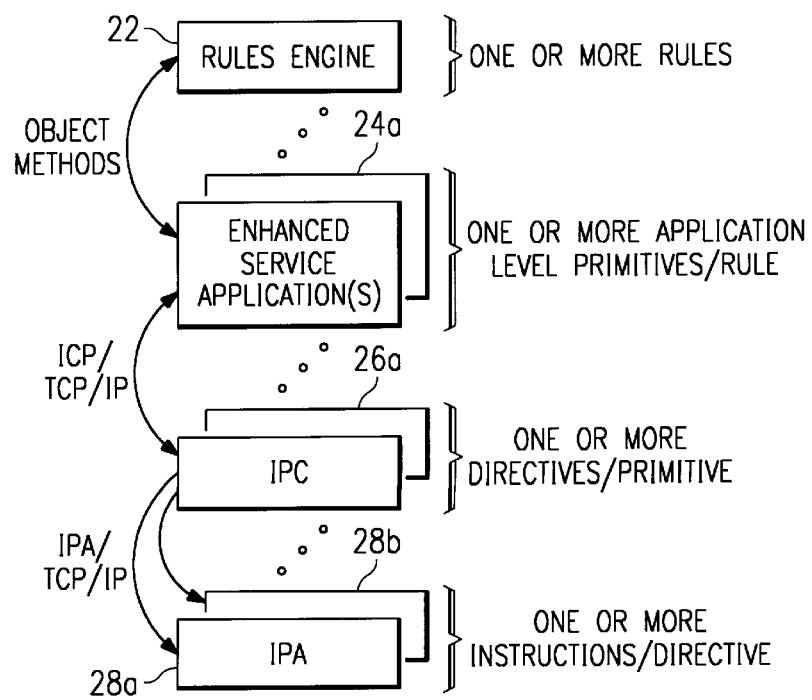
FIG. 3 is a detailed block diagram illustrating the "abstracted" control hierarchy of the present invention.

Referring now to FIG. 3, a more detailed block diagram is shown of the logical and physical relationships among each of these SCP' elements. As noted above, the rules engine 22 forms the highest level of the distributed or "abstracted" control paradigm of the invention. Rules engine 22 comprises the various rules created (typically by a service creation environment (SCE) graphical user interface (GUI) or the like) that define the AIN service logic for a particular call or call treatment. The rules engine 22 is typically instantiated in each enhanced service application 24a and thus communications between the rules engine 22 and the enhanced service application are effected via a set of object methods. The enhanced service application 24a communicates with its associated intelligent peripheral controller 26 via an IPC protocol message running over a TCP/IP (or the like) transport layer. Rules engine 22, enhanced service (ES) application 24a and IPC 26a are preferably supported in the SCP 14.' Thus, SCP 14' has significantly more functionality than a conventional service control point associated with known AIN implementations. This allows manipulation of the call with a much finer degree of control. In particular, a call can be directed through its entire life cycle in a much more robust manner. As a by-product, the SCP can control the call flow rather than merely acting as a database that responds to external triggers, as in the prior art.

The intelligent peripheral controller (IPC) 26a communicates with one or more intelligent peripheral adapters (IPAs) 28a via an IPA protocol message running over a TCP/IP (or the like) connection. This connection, as will be seen, may be within a given machine (if both the IPA and IPC are supported on the same platform) or across the network (if the IPA and IPC are supported on different platforms). In particular, a given IPA may be supported on either the SCP 14' or on some other network switch or resource. This "abstracted" control architecture eliminates hardware and resource dependencies otherwise associated with known prior art AIN implementations.

Figure 4:
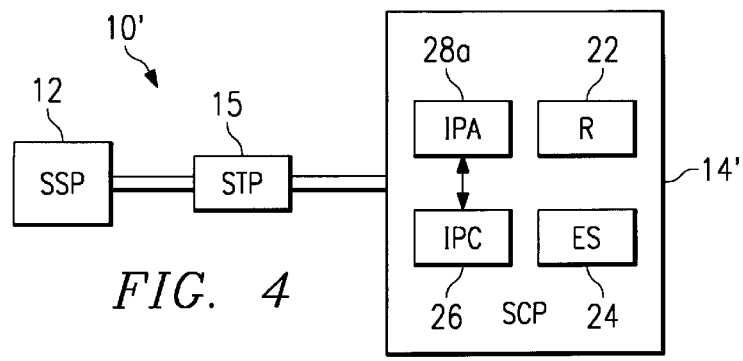
FIG. 4 is a Type I advanced intelligent network implementation according to the present invention.

An example of a Type I IPA system 10' is illustrated in FIG. 4. In this example, an IPA 28a is supported in the SCP 14'. SSP 12 is a conventional switching system that supports a call model having a number of well-defined PICs and triggers. Thus, SSP 10 supports a conventional AIN feature set. When a trigger occurs at a trigger detection point, normal call processing is suspended by the SSP 12 and a query message is sent to the SCP 14'. In particular, the AIN query is delivered via the AIN protocol over the SS7 transport layer through the STP 15 and then to the IPA 28a. As discussed above with respect to FIG. 3, IPA 28a passes the AIN query to its associated IPC 26 (via IPA protocol over TCP/IP link 35) which, in turn, passes the message (via IPC protocol over TCP/IP) to its associated enhanced service (ES) application for processing according to a particular rule. After the service logic (as defined by the ES, in association with one or more rules of the rules engine 22) acts on the query, the result is passed back down the hierarchy to the IPA 28a, back out over the network, and then returned to the SSP.

Figure 5:
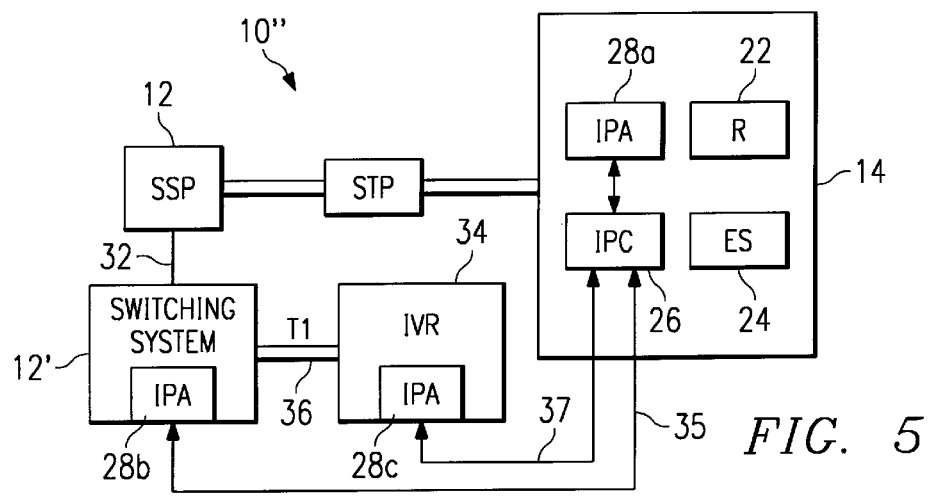
FIG. 5 is a combined Type I/Type II advanced intelligent network implementation according to the present invention.

An example of a combined Type I/Type II system 10" is illustrated in FIG. 5. In this example, SCP 14' supports an IPA 28a. The rules engine 22, enhanced service application 24 and IPC 26 are supported on (or otherwise associated with) the SCP 14' (or some system connectable to the SCP 14'). Switching system 12' is connectable to the SSP 12 via link 32 (e.g., running ISUP protocol over an SS7 transport layer). It includes an IPA 28b connectable to the SCP 14' IPC via link 35 (e.g., running IPA protocol over TCP/IP transport layer). System 10" also includes a intelligent voice response (IVR) unit 34 connected to the switching system 12' via a set of T1 trunks 36. IVR 34 preferably supports its own IPA 28c, which is connected to the IPC 26 in the SCP 14' via a link 37 (e.g., running IPA protocol preferably over a TCP/IP transport layer). Thus, in the illustrative embodiment of FIG. 5, IPC has three (3) IPAs 28a, 28b and 28c associated therewith. IPA 28a and IPA 28b are each a Type I IPA (because it is associated with a network connection) and IPA 28c is a Type II IPA (because it is associated with a non-network connection, namely, the IVR 34). The links 35 and 37 each connect the respective IPA to its controlling IPC.

In this example, the call is initially handled by IPA 28a. When a trigger event occurs, the call is terminated (from the SSP's perspective) and call control is passed to the switching system 12' via link 32. The switching system 12' formulates an IPA message, which is then delivered via the link 35 to the IPC 26 supported on or associated with the SCP 14'. Assume that a particular treatment requires the playing of a message and the monitoring of the line for digit collection. These tasks can be carried out by the IVR 34. Thus, in accordance with the service logic defined in the enhanced service (ES) application 24, the IPC generates one or more control directives which are then passed over link 37 to the IPA 28c in the IVR 34. IPA 28c then generates appropriate control instructions for the IVR hardware to generate the necessary voice announcements (which are then delivered to the switching system 12' via the T1 trunks) and to condition the appropriate hardware for digit collection.

Figure 6:
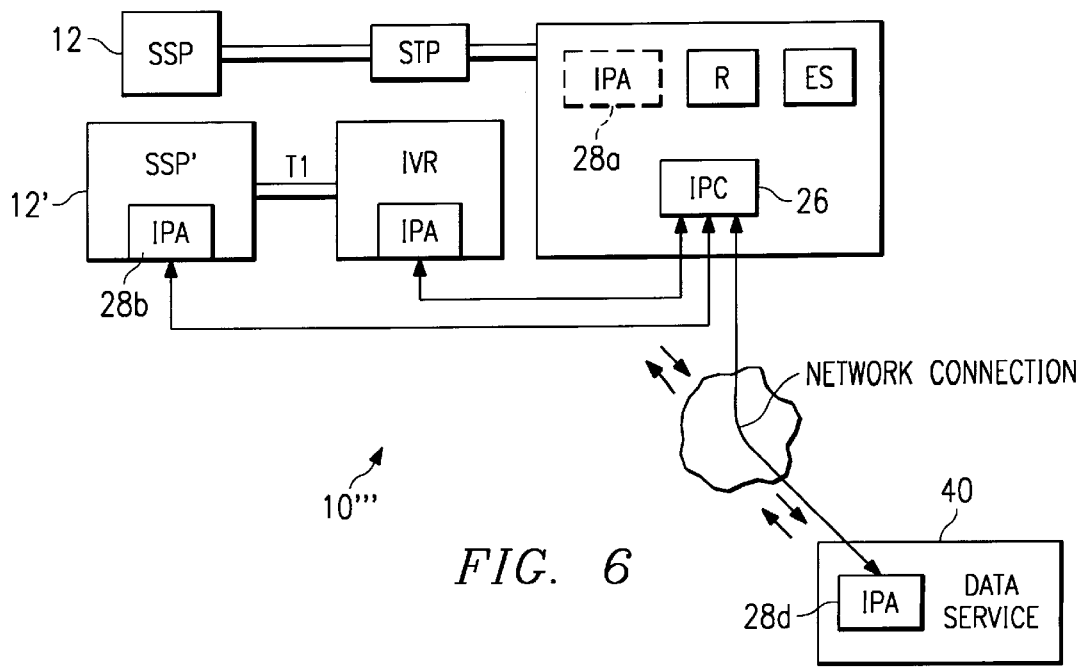
FIG. 6 is a combined Type II/Type III advanced intelligent network implementation according to the teachings of the present invention.

A combined Type II/Type III AIN system 10''' is illustrated in FIG. 6. The AIN system 10''' is similar in structure to the system 10' of FIG. 5 but also includes a data service 40 associated therewith. The SCP 14' may or may not include the embedded IPA 28a, which is therefore illustrated in phantom. A representative data service 40 provides credit card validation. Service 40 may provide any other type of data connection (e.g., such an operator services, LIDB database services, IS41C cellular service, or the like). Data service 40 supports its own IPA 28d, which interfaces to the IPC 26 supported in the SCP 14'. Thus, during the processing of a given call treatment, control may be transferred to and from the data service 40 in the manner previously described.

In each of the three (3) illustrative embodiments, it can be seen that a given enhanced service (ES) application and its associated IPC are not dependent on the actual AIN or non-AIN network switch or resource that provides given functionality associated with the application logic. This separation of AIN service logic from the actual structure or means that performs the physical function is an important advantage of the present invention. The switch and resource limitations or dependencies no longer limit the flexibility of the AIN service creation. This frees-up the service provider to create new enhanced services via the rules engine that could not be previously provisioned using the limited AIN feature set of existing SSPs and/or SCPs.

The enhanced SCP 14' and, in particular, the abstracted control hierarchy supported thereon or associated therewith, provides significant advantages over the prior art. One or more of the IPAs associated with each IPC may be distributed across switches and/or resources in the AIN or connectable to the AIN. In conjunction with a service control environment, any number of diverse and robust enhanced services may then be provisioned and implemented in addition to the providing of basic AIN services. The control software is configured as a layered control environment, with each layer being abstracted from the layer below. A given IPA communicates with its controlling IPC using a special protocol running over a (preferably) TCP/IP connection. That link, however, may be intra- or inter-platform.

The present invention provides many advantages. It allows the SCP itself to actually perform meaningful and complete call control throughout the call's life cycle that has been possible previously. By abstracting the control in the manner described, it does not matter if various network elements (i.e., switches or other resources) are AIN- or non-AIN complaint as the architecture maintains control over all routing necessary during the entire life cycle.

One of the preferred implementations of the invention is as a set of instructions (program code) in a code module resident in the random access memory of a workstation or personal computer. A preferred computer is any personal computer or workstation client or server platform that is Intel-, PowerPC®- or RISC®-based, and that includes an operating system such as IBM® OS/2®, Microsoft Windows 95, Microsoft Windows NT 4.0, Unix, AIX®, OS/400 or the like. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by Letters Patent is set forth in the following claims.

What is claimed is:

1. Apparatus for implementing an enhanced service in an advanced intelligent network having a service control point (SCP), comprising:

an enhanced service application having at least one rule for defining the enhanced service, the enhanced service application executable by the SCP to generate a set of one or more application level service primitives for each rule;

at least one intelligent peripheral controller (IPC) associated with the enhanced service application, the IPC executable on the SCP for translating each application level service primitive into a set of one or more resource directives; and at least one intelligent peripheral adapter associated with the IPC for translating each resource directive into a set of one or more instructions for controlling a given resource, wherein the resource is selected from the group consisting of the SCP, a switch, a non-network resource and a data service.

2. The apparatus as described in claim 1 further including a rules engine for supporting the rule.

3. The apparatus as described in claim 1 wherein the enhanced service application communicates with the IPC via an IPC protocol message running over a TCP/IP connection.

4. The apparatus as described in claim 1 wherein the IPC communicates with the IPA via an IPA protocol message running over a TCP/IP connection.

5. The apparatus as described in claim 4 wherein the TCP/IP connection is within a given platform.

6. The apparatus as described in claim 4 wherein the TCP/IP connection is across a set of platforms.

7. The apparatus as described in claim 1 wherein the enhanced service application is resource-independent.

8. The apparatus as described in claim 7 wherein the IPC is hardware-independent.

* * * * *